United States Patent [19]
Bentley et al.

[11] Patent Number: 5,613,701
[45] Date of Patent: Mar. 25, 1997

[54] BREAK-AWAY FASTENING SYSTEM FOR AIR BAG DEPLOYMENT DOORS

[75] Inventors: Fred M. Bentley, Layton, Utah; Denis J. Tostain, Cergy Le Haut, France

[73] Assignees: Morton International Inc., Chicago, Ill.; Allibert Industrie S.A., France

[21] Appl. No.: 442,173

[22] Filed: May 16, 1995

[51] Int. Cl.⁶ ................................................ B60R 21/16
[52] U.S. Cl. ................................ 280/728.3; 280/728.2
[58] Field of Search ............................... 851/5; 411/360, 411/508, 509, 45; 280/732, 728, 728.3, 728.1, 728.2; 24/662

[56] References Cited

U.S. PATENT DOCUMENTS

| | | |
|---|---|---|
| 3,822,894 | 7/1974 | Muller et al. . |
| 3,944,250 | 3/1976 | Wulf et al. . |
| 4,716,633 | 1/1988 | Leandre Rizo ........................ 24/453 |
| 4,893,833 | 1/1990 | DiSalvo et al. . |
| 4,911,471 | 3/1990 | Hirabayashi . |
| 4,964,653 | 10/1990 | Parker . |
| 5,031,930 | 7/1991 | Sato . |
| 5,064,217 | 11/1991 | Shiraki . |
| 5,072,967 | 12/1991 | Batchelder et al. . |
| 5,082,310 | 1/1992 | Bauer . |
| 5,096,221 | 3/1992 | Combs et al. . |
| 5,150,919 | 9/1992 | Sakakida et al. . |
| 5,195,776 | 3/1993 | Sakakida et al. . |
| 5,199,739 | 4/1993 | Fujiwara et al. . |
| 5,211,421 | 5/1993 | Catron . |
| 5,211,422 | 5/1993 | Frantz et al. . |
| 5,219,177 | 6/1993 | Wang . |
| 5,242,191 | 9/1993 | Faigle et al. . |
| 5,335,939 | 8/1994 | Kuriyama et al. ............. 280/728 B |
| 5,451,074 | 6/1995 | Guitarini ........................ 280/728.3 |
| 5,472,228 | 12/1995 | Bentley et al. ................ 280/728.3 |

FOREIGN PATENT DOCUMENTS

| | | |
|---|---|---|
| 0415362 | 3/1991 | European Pat. Off. . |
| 3843686A1 | 6/1990 | Germany . |

*Primary Examiner*—Brian L. Johnson
*Assistant Examiner*—Jonathan E. Butts
*Attorney, Agent, or Firm*—Mason, Kolehmainen, Rathburn & Wyss

[57] ABSTRACT

A break-away fastener system for an air bag deployment door designed for normally closing a panel opening in the vehicle adjacent the open end of a housing containing an air bag in a folded-up, non-deployed condition in readiness for rapid inflation in an emergency to protect persons in the vehicle. The fastening system includes one or more spaced apart fastener assemblies, each including a male element and a female element extending between a portion of the door overlapping an edge flange of the vehicle panel around the opening used for air bag deployment. The male element comprises a bayonet-like member having an enlarged free end adapted to snap into a female element including a receiving spring clip, which clip permanently retains the male element even after air bag deployment occurs. A base portion of each male element is secured to the door at a central portion of a frangible section of reduced cross-section designed to fracture along a path extending around the base of the male element. A small portion of the door remains with each fastener assembly after the door is pushed to open outwardly upon air bag deployment. Only a smooth back face of the cover is presented to the expanding air bag so that no damage occurs to the rapidly inflating air bag because of cutting, ripping or tearing thereof during air bag deployment.

25 Claims, 5 Drawing Sheets

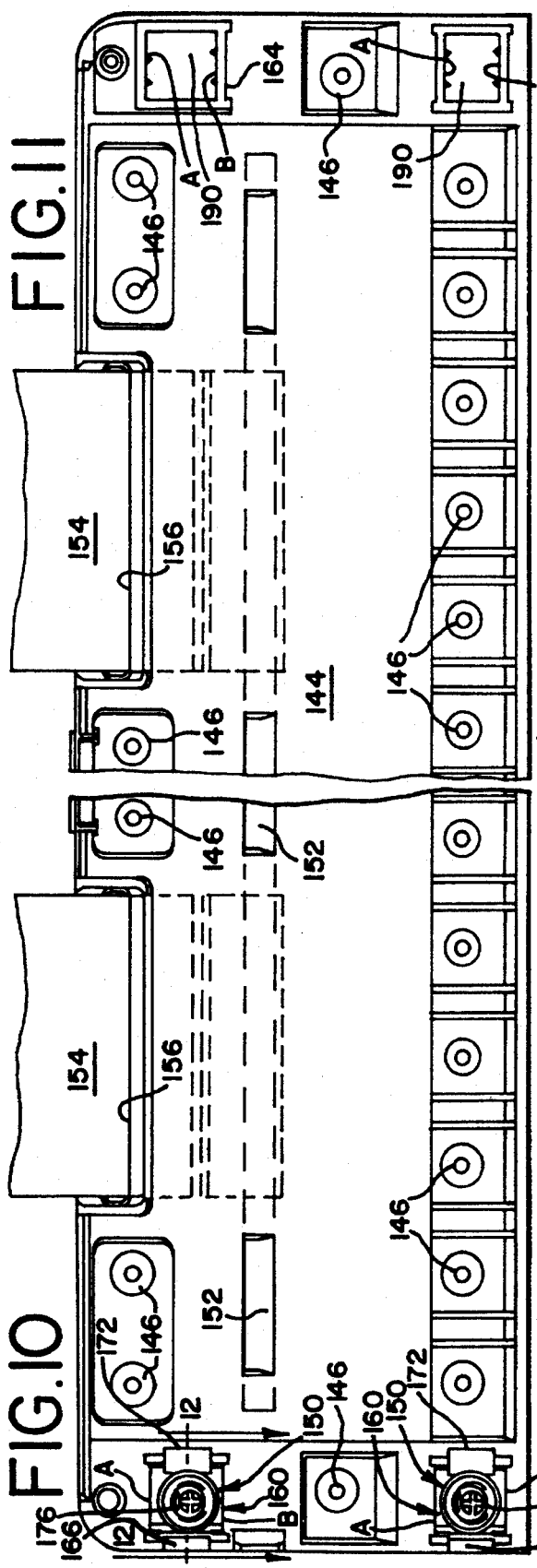
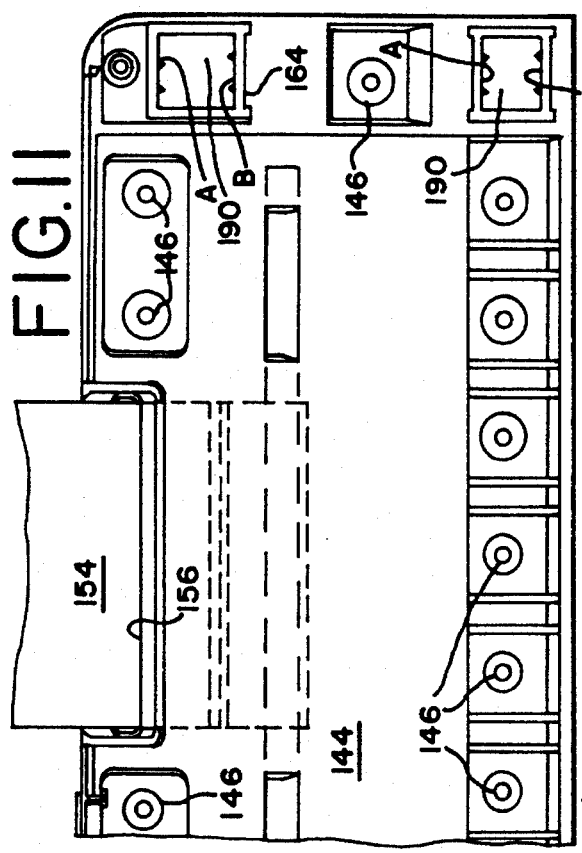
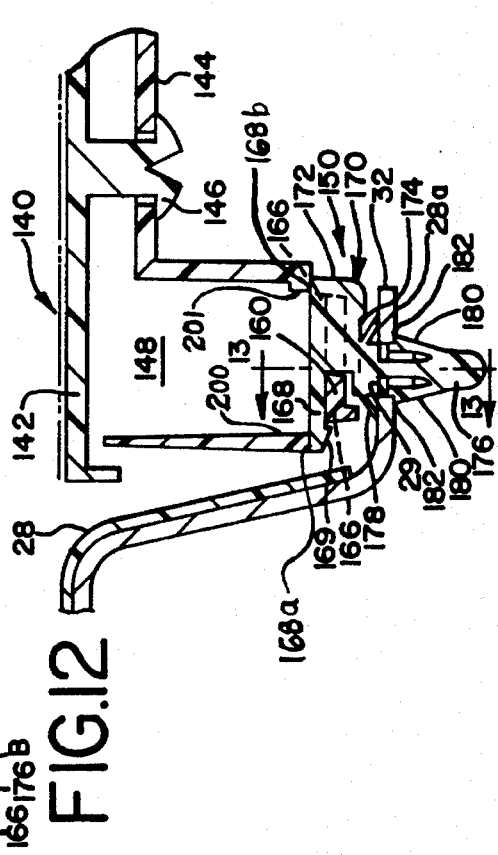
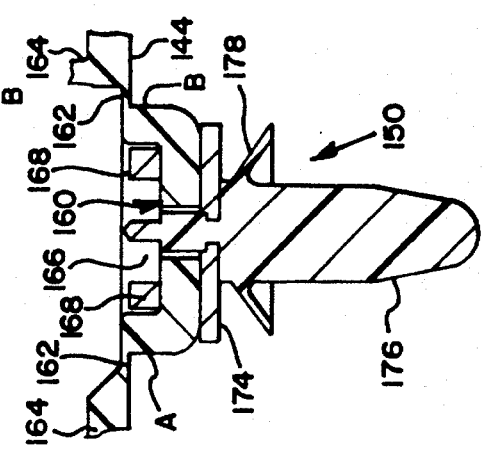

BREAK-AWAY FASTENING SYSTEM FOR AIR BAG DEPLOYMENT DOORS

BACKGROUND OF THE INVENTION

2. Field of the Invention

The present invention relates generally to air bag systems and more particularly to a break-away fastening system for deployment doors which are forced away from a panel opening upon air bag deployment. The panel opening for a concealed air bag system of a vehicle is normally closed by a cover or door(s) held in place by a fastening system which is designed to fracture in a controlled manner during air bag deployment so that uncontrolled fragments of the doors, fasteners or other system components are not generated and dispersed around the area. Also, when fracture occurs, only a smooth face is presented to the expanding air bag so that damage to the air bag does not occur during rapid deployment thereof.

2. Background of the Prior Art

U.S. Pat. No. 3,822,894 to Muller et al. discloses a steering wheel having a built-in air cushion employing a strong hinge between a cover and a dish containing the air bag so that on inflation, the cover is pushed away but not completely liberated from attachment to the steering wheel.

The Wulf et al., U.S. Pat. No. 3,944,250, discloses an automatically inflatable gas cushion for the protection of passengers in vehicles employing a cover which is opened upon inflation of the air bag or gas cushion and which is retained by a flexible band so that the cover is restrained after opening.

The DiSalvo et al., U.S. Pat. No. 4,893,833, discloses a closure for an air bag deployment opening wherein an integral aluminum hinge flange on the closure is bolted to the frame of the vehicle permitting pivotal opening movement of the closure.

The Hirabayashi, U.S. Pat. No. 4,911,471, discloses an arrangement of an air bag device in a motor vehicle wherein angular pivotal movement of a door over the air bag is restricted by a strap to limit the angular degree of opening when the air bag is inflated.

U.S. Pat. No. 4,964,653 to Parker discloses a self-skinned foam closure element for an inflatable restraint door assembly having a combination hinge and tether for restraining travel of the closure element during air bag deployment.

U.S. Pat. No. 5,031,930 to Sato discloses an air bag system having deployment doors connected to air bag module side plates by small pins which are fractured upon air bag deployment to release the doors.

U.S. Pat. No. 5,064,217 to Shiracki discloses a cover for an air bag unit having "Nylon" yarn bands molded in place and wrapped around a retaining band of resin provided on the air bag enclosure or housing.

U.S. Pat. No. 5,082,310 to Bauer discloses an arrangement for providing an air bag deployment opening including a door having a weakened section which fractures to allow separate door portions to open upon air bag deployment.

U.S. Pat. No. 5,150,919 to Sakakida et al. discloses an air bag system for a vehicle having a pair of doors or lids which pivotally open in opposite direction and which are restrained by belt members so that the lids pivot about transverse axes and open smoothly upon air bag deployment.

U.S. Pat. No. 5,195,776 to Sakakida et al. discloses an air bag installation having curved air bag cover lids which are reliably opened by rotation about a center point so as not to restrict the inflation of the air bag.

U.S. Pat. No. 5,072,967 to Batchelder et al. discloses an instrument panel having an invisible air bag deployment door with weakened sections formed therein but hidden from view for facilitating fracture of the door along predetermined lines for opening movement during air bag deployment.

The Combs et al., U.S. Pat. No. 5,096,221, discloses an air bag door having plural substrates on the inside which normally retain the door in a closed position and at least one of which is notched or provided with a hidden tear seam to facilitate fracture for opening of the door.

The Catron et al., U.S. Pat. No. 5,211,421, discloses an air bag cover door retainer having bifurcated engagement flanges on the door normally retaining the door in a closed position and releasable to permit door opening during air bag deployment.

U.S. Pat. No. 5,211,422 to Frantz et al. discloses an occupant restraint system including an air bag having an upper reaction member that is initially restrained upon air bag deployment until side portions unfold and release restraints on the reaction member.

The Fujiwara et al., U.S. Pat. No. 5,199,739, discloses an air bag cover opening mechanism for a motor vehicle including a sheer pin which is severed upon opening pressure exerted on the inside of the door by the deploying air bag.

The Wang, U.S. Pat. No. 5,219,177, discloses a releasable latch for an air bag deployment door which is activated by air bag deployment to permit the door to open.

U.S. Patent to Faigle et al. U.S. Pat. No. 5,242,191, discloses a tethered air bag cover system wherein the cover is retained after opening attached to the air bag itself.

European Patent Application No. EPO 0415 362 A2 discloses an air bag supporting system having two fly-away covers restrained by loose flexible straps.

German Patent No. DE 38 43 686 A1 discloses an air bag cover for a car which is retained in one piece in relation to the dashboard of the automobile by a retaining hinge element.

OBJECTS OF THE INVENTION

It is an object of the present invention to provide a new and improved air bag system for motor vehicles and the like and more particularly to provide a new and improved break-away fastening system for air bag deployment doors.

It is another object of the present invention to provide a new and improved break-away fasteners for an air bag deployment door(s) which positively retains the doors in place over an air bag deployment opening and which is readily fractured in a controlled manner to release said door(s) to open when the associated air bag is deployed.

Still another object of the present invention is to provide a new and improved door fastener system for an air bag system including integral fasteners which are easily attachable around the edge of an air bag opening in a panel to firmly secure the door(s) in place until air bag deployment occurs.

Yet another object of the present invention is to provide a new and improved fastener system for an air bag door which is low in cost, integrally formed on the inside of a door, and designed to fracture in a particular place during air bag deployment so that randomly formed loose fragments are not generated.

Another object of the present invention is to provide a new and improved air bag system of the character described which is designed to fracture in a particular place during air bag deployment in a manner whereby only a smooth surface is presented to the deploying air bag so that damage to the inflating air bag from the open door or cover does not occur.

BRIEF SUMMARY OF THE PRESENT INVENTION

The foregoing objects and advantages of the present invention are accomplished in a new and improved break-away fastener system for air bag deployment doors employing one or more fasteners on an inside surface of the door. The door is designed for normally closing a panel opening in the vehicle adjacent the open end of a housing containing an air bag in a folded-up, non-deployed condition in readiness for rapid inflation in an emergency to protect persons in the vehicle. The fastening system includes a plurality of spaced apart fasteners including bayonet-like elements extending between overlapping edge portions of the door and edge flanges of vehicle panel around an opening for air bag deployment aligned with an air bag container. The bayonet-like elements have an enlarged free end adapted to snap into a receiving spring clip which clip retains the fasteners thereafter even when air bag deployment occurs. A base of each bayonet-like element is secured to the door at a central portion of an annular frangible section of reduced cross-section designed to fracture around the base of the bayonet-like element and remain therewith when the door is pushed outwardly upon air bag deployment as the air bag inflates and moves out through the panel opening. After fracture has occurred, only a smooth surface on the inside or back face of the door confronts the expanding air bag so that no damage to the air bag occurs.

BRIEF DESCRIPTION OF THE DRAWINGS

For a better understanding of the present invention, reference should be had to the following detailed description taken in conjunction with the drawings, in which:

FIG. 10 is a back side view of the door taken substantially along lines 10—10 of FIG. 8 showing the door in a closed position;

FIG. 11 is a back side view of the door taken substantially along lines 11—11 of FIG. 9 showing the door in an open position after air bag deployment has occurred;

FIG. 12 is an enlarged, fragmentary, cross-sectional view of a fastener in accordance with the present invention for mounting the door in place in a closed position taken substantially along lines 12—12 of FIG. 10; and FIG. 13 is a cross-sectional view taken substantially along lines 13—13 of FIG. 12.

DETAILED DESCRIPTION OF A PREFERRED EMBODIMENT OF THE INVENTION

Figure 1:
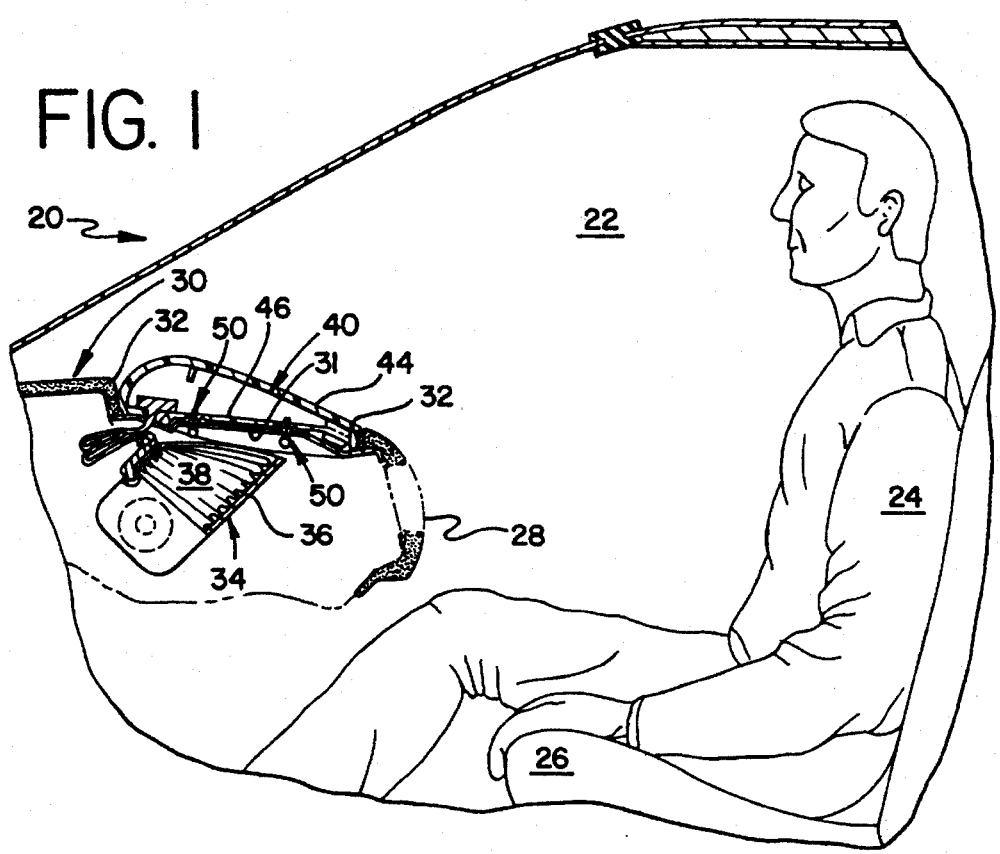
FIG. 1 is a longitudinal cross-sectional view of a motor vehicle illustrating a break-away fastening system for an air bag deployment door or cover constructed in accordance with the features of the present invention and shown with a door in place on a panel covering an air bag deployment opening while the bag is in deflated condition.
Figure 2:
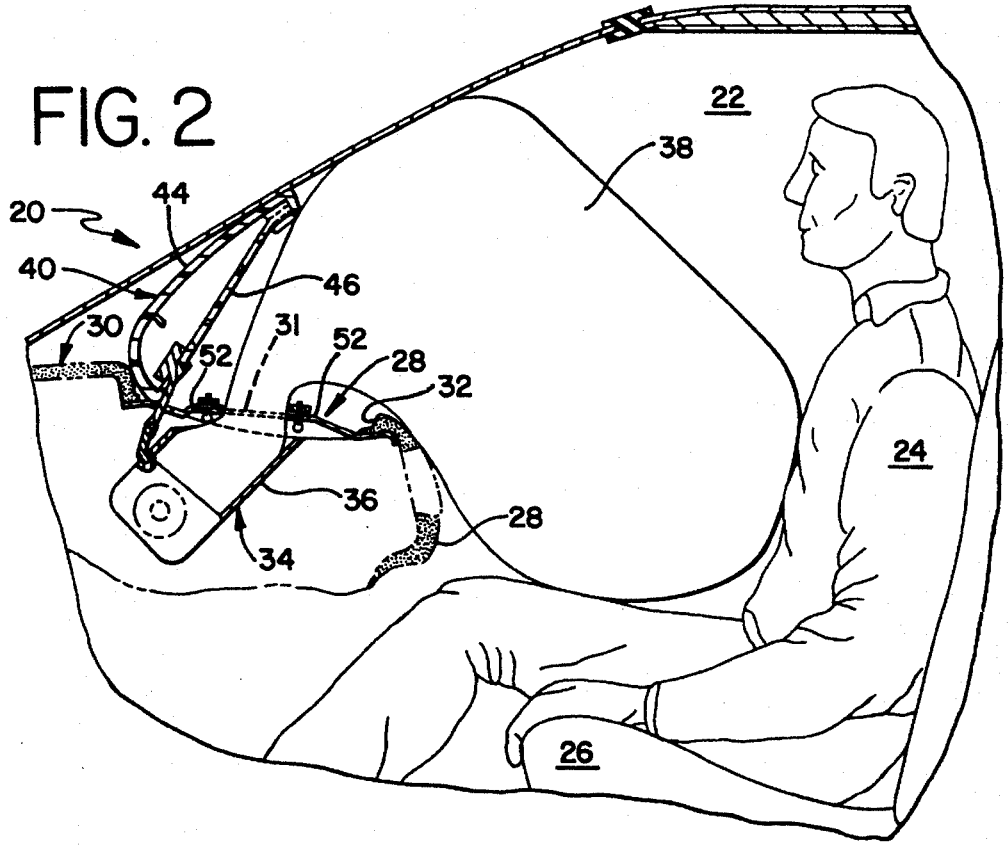
FIG. 2 is a longitudinal cross-sectional view similar to FIG. 1 but illustrating the air bag in a deployed position with the door open after fracture of the fastener system has occurred during air bag deployment.

Referring now more particularly to the drawings, in FIGS. 1–2 is illustrated a motor vehicle 20 having a passenger compartment 22 for accommodating one or more persons 24 in seated position on a vehicle seat 26. Forward of the occupant 24, the vehicle 20 includes a dashboard 28 and a panel 30 having an enlarged opening 32 spaced directly above an air bag and inflator assembly, generally indicated by the reference numeral 34. The air bag and inflator assembly 34 includes a housing or canister 36 fixedly mounted in place beneath the panel 30 and the air bag deployment opening 32. An air bag 38 in deflated or non-deployed condition is stored, protected and contained within the housing 36 until deployment as illustrated in FIG. 2 to protect the vehicle occupant 24 from injury in an accident.

Figure 4:
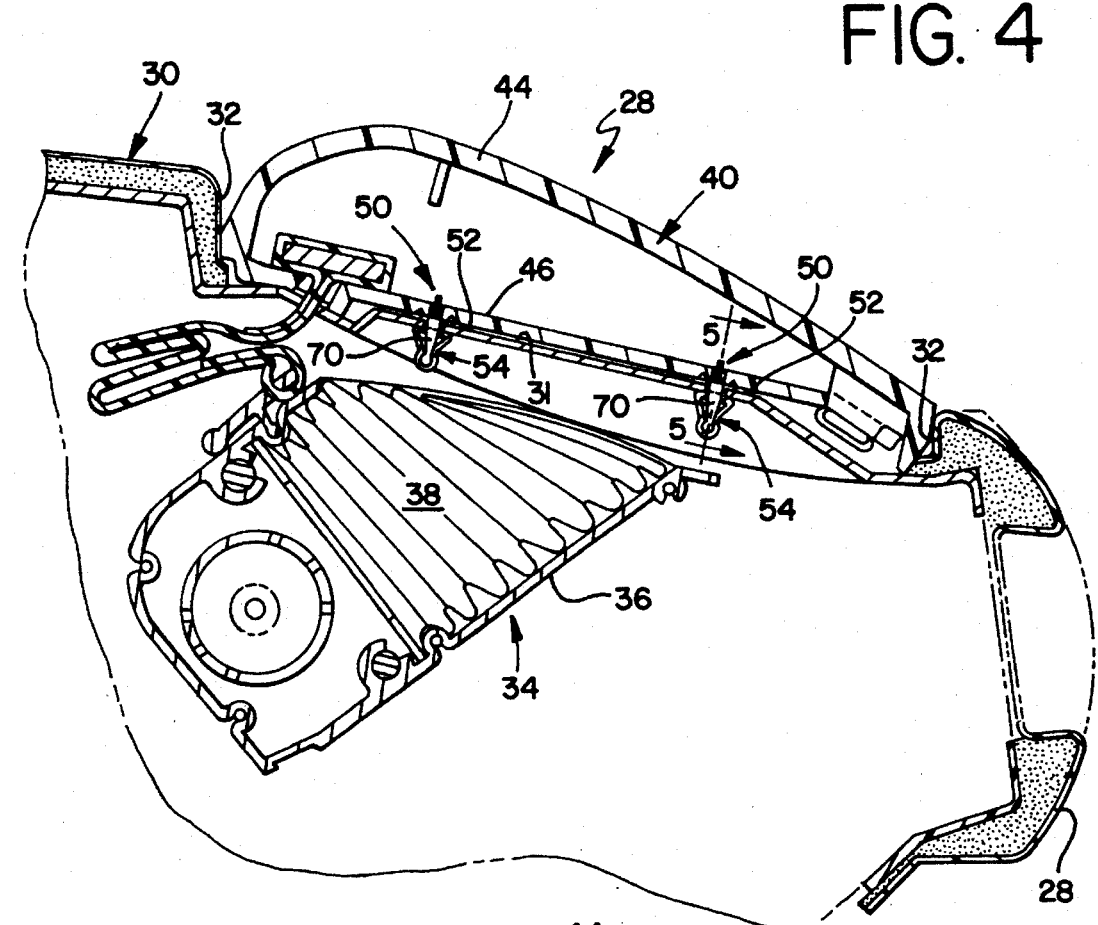
FIG. 4 is an enlarged, fragmentary cross-sectional view similar to that of FIG. 1 showing the door while secured in place with the fastening system and closing the panel opening.

The panel opening 32 is normally closed by a movable, air bag deployment door or cover 40, which as shown in FIGS. 1 and 4 forms part of the upper surface of the panel 30 above the opening 32. When the air bag 38 is inflated during a crash or emergency and expands rapidly outwardly, the door 40 is rapidly moved away from the panel opening 32 permitting the expanding air bag to inflate with little or no interference as shown in FIG. 2. The door 40 includes an outer skin 44 and an inner skin 46 preferably formed of molded, resinous plastic material to provide strength and integrity for the door 40 as a whole so that break up or fracture thereof into several smaller pieces does not occur upon air bag deployment. The outer skin 44 and the inner skin 46 are joined together around the periphery to form a strong, lightweight hollow door structure.

In accordance with the invention, the door 40 is normally retained in a closed position (FIG. 1) directly above and over the air bag panel opening 32 by a fastening system including a plurality of break-away fastener assemblies 50 positioned at spaced apart locations such as opposite ends and/or opposite sides of the door 40. The fastener assemblies 50 comprise pin and socket connectors which extend directly between an inside downwardly facing surface of the inner skin 46 of the door 40 and an opposite upwardly facing surfaces 52 on a panel edge flange 31 which extends along opposite ends or sides of the air bag panel opening 32. Until the air bag 38 is deployed, the door 40 is secured in place to cover over the air bag deployment opening 32 in the vehicle panel 30 to protect the air bag 38 and inflator assembly 34 from damage by limiting external access thereto.

Figure 5:
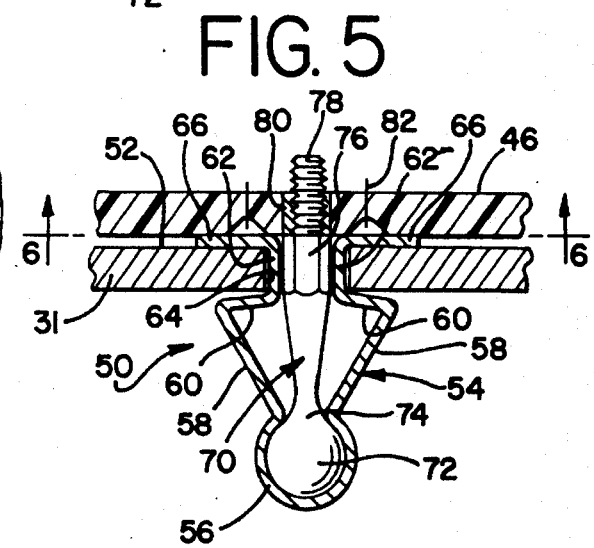
FIG. 5 is an enlarged, fragmentary, cross-sectional view taken substantially along lines 5—5 of FIG. 4.
Figure 6:
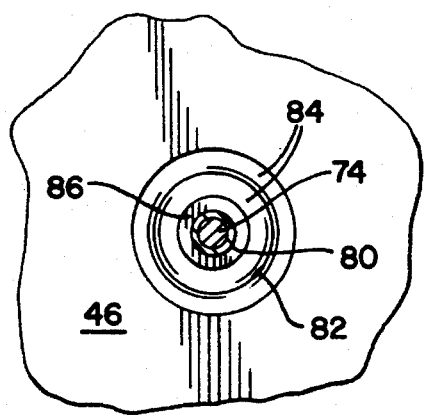
FIG. 6 is a cross-sectional view taken along lines 6—6 of FIG. 5.
Figure 7:
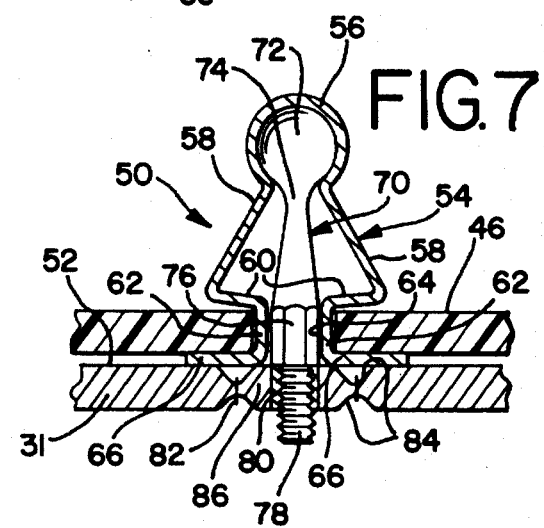
FIG. 7 is an enlarged fragmentary view similar to FIG. 5 illustrating an alternate embodiment of a break-away fastening system in accordance with the present invention.

As shown in FIGS. 5 and 7, each fastener assembly 50 includes a pin 70 and socket 54 and the socket comprises a metal spring clip 54 having a generally circular shaped, closed end 56 integrally joined to a pair of relatively long, thin, angularly divergent, deflectable legs 58. The divergent flexible legs 58 are integrally joined with a pair of opposite, aligned base legs 60, generally transverse thereto and the base legs are adapted to bear against an adjacent surface of the edge flange 31 or the inner skin 46 of the door or cover 40 as the case may be. The female spring clips 54 further include a pair of parallel, spaced apart, mounting legs 62 integrally joining inner ends of the base legs 60 and adapted to extend into and through a mounting aperture or hole 64 positioned at an appropriate location in the edge flange 31 or the door skin 46 as the case may be (FIGS. 5 and 7, respectively). Each spring clip 54 also includes a pair of opposite, outwardly extending, retention tabs 66, each integrally joining a mounting leg 62 and adapted to bear against the surface of the edge flange 31 or inner door skin 46 on which the spring clip is mounted to hold the spring clip in place after insertion.

Each fastener assembly 50 includes a bayonet-like, male element or stud 70 designed to project into and through an aperture 64 and between the mounting legs 62 of a spring clip 54 in the aperture. The studs 70 include an enlarged retainer ball 72 at the free end designed to snap into and seat with the circular end 56 of a spring clip 54.

After an air bag assembly 34 is in place in the vehicle 20, the door or cover 40 is positioned above the panel opening 32 and moved downwardly toward the panel 30 to the closed position of FIGS. 1 and 4. As the cover 40 is mounted in place, the bayonet-like studs 70 are forced down into the apertures 64 in an edge flange 31 or door skin 46 (FIGS. 5 and 7, respectively), and the deflectable legs 58 of the spring clips 54 are cammed oppositely outwardly away from one another until the balls 72 of the studs are firmly seated in the circular end portions or sockets 56 of the spring clips 54 allowing the legs to snap or spring back inwardly toward one another to lock the studs and spring clip of each fastener assembly 50 together for retaining the door or cover 40 in the closed protective position (FIGS. 1 and 4) over the air bag panel opening 32 until air bag deployment occurs.

Referring now more particularly to FIGS. 5 and 7, in accordance with the present invention, each male stud 70 includes a minimum width, stem segment 74 immediately inward of the enlarged ball 72 at the outer free end and the stem segment gradually increases in width or transverse dimension toward a base end, stop portion 76 of hexagonal or polygonal cross-section having wrench receiving flats for facilitating installation of the studs. The studs 70 also include a threaded inner end portion 78 extending coaxially from the base end portion 76 in a direction oppositely away from the ball 72. The threaded end portion 78 is adapted to be threaded into an internally threaded tubular collar 80, mounted in a panel edge flange 31 or inner skin 46 of a panel door in coaxial alignment with an aperture 64 and female spring clip 54 associated with the respective stud.

Figure 4A:
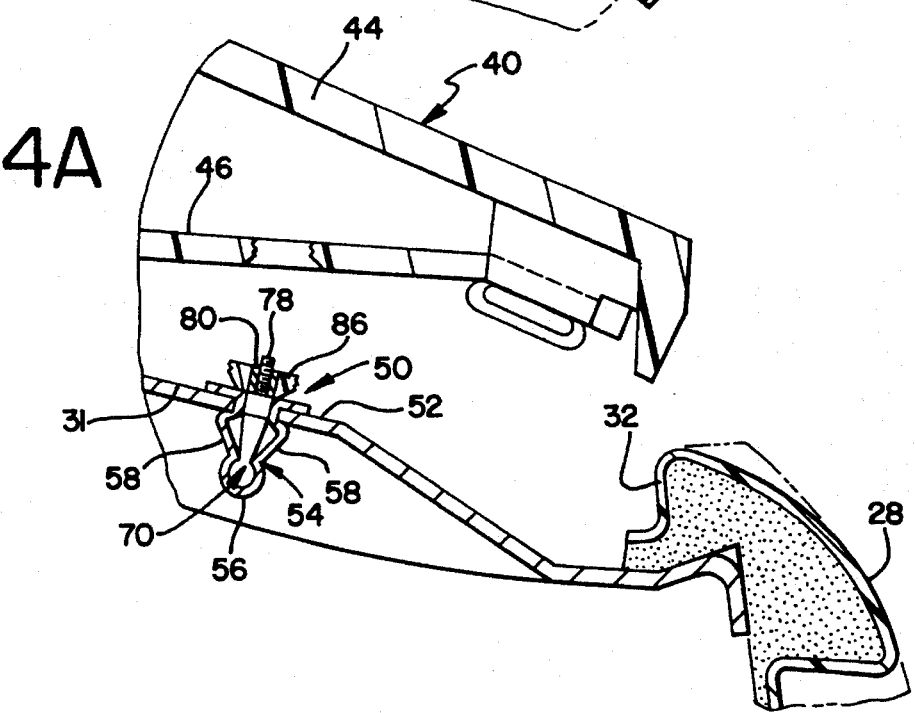
FIG. 4A is a fragmentary cross-sectional view similar to FIG. 4 but showing the door in an open position after an air bag deployment has occurred.

In accordance with the present invention, the hollow metal, internally threaded collars 80 receiving the threaded end portions 78 of the studs 70 are molded in place in the inner skin 46 of the door or cover 40 (FIG. 5) or a press-fitted or otherwise permanently attached in place the panel edge flange 31 (FIG. 7). In each case, around each collar 80, a generally circular-shaped, definitive, fracture or severance zone 82 is established in the substrate of a door 40 or edge flange 31 by means of one more circular weakening grooves 84 of V-shaped diametrical cross-section which reduce the thickness of the substrate so that a fracture along the apex of the groove occurs when the door 40 is opened outwardly (FIGS. 2 and 4A) by the pressure exerted from a rapidly expanding inflating air bag 38.

Figure 3:
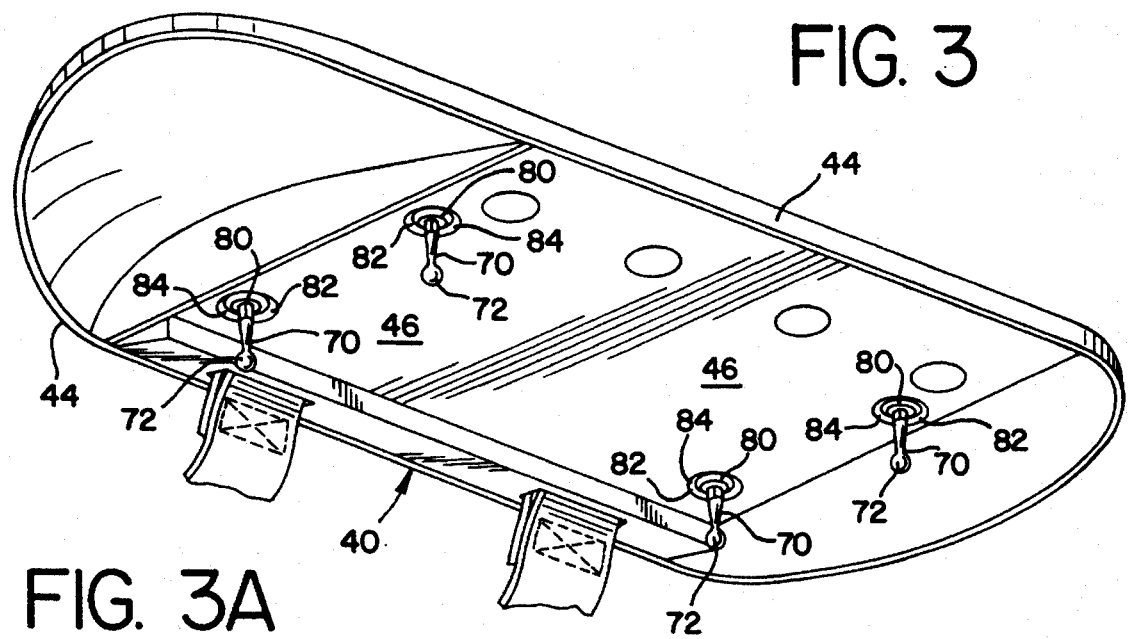
FIG. 3 is an underside view of one embodiment of a door or cover for an air bag deployment opening constructed in accordance with the features of the present invention with bayonet elements mounted on the cover.
Figure 3A:
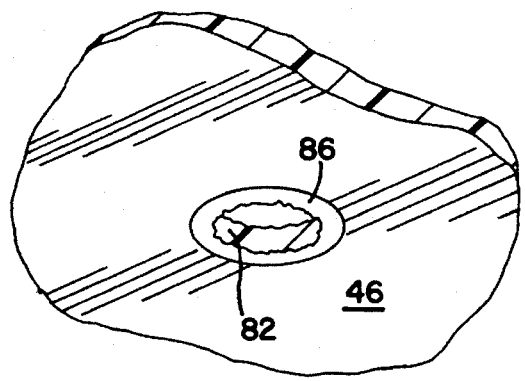
FIG. 3A is a fragmentary view of the underside of the door or cover after an air bag deployment has occurred.

The weakening grooves 84 prevent random fracturing of the door 40 or panel edge flange 31 during air bag deployment and the zone of fracture is precisely defined by the location of the apex of the circular weakening grooves so that a small amount of substrate 86 around the collars 80 (FIG. 4A) is positively retained with the collar upon air bag deployment. Also, the male studs 70 are positively retained in a snap-in locked position by the associated female spring clip 54 leaving a generally circular-shaped hole or opening 82 in one substrate member (FIG. 3A) opposite to that substrate member on which the spring clip 54 and associated stud 70 of each break-away fastener assembly 50 is continuously retained, before, during and after deployment of the air bag 38.

After installation of the door 40 in place over the opening 32 in the panel 30 if it is desirable to service the air bag assembly 34 or remove the assembly from vehicle 20, the deflectable legs 58 may be spread apart near the neck end portion adjacent the circular-shaped closed end 56 of the spring clips 54 to release the balls 72 on the free outer ends of the studs 70 for withdrawal.

It is thus seen that the break-away fastening system in accordance with the present invention, insures that random or multiple fragments of door, edge flange or other components are not generated by air bag deployment creating unwanted flying objects and that positive retention of the protective door or cover is provided after installation until the air bag is used. Moreover, the system is low in cost, reliable and foolproof in operation and easy to install after an air bag inflator system is in place.

Referring now to FIGS. 8–13, therein is yet another embodiment of a new and improved break-away door fastening system 100 for use in the passenger compartment 22 of a motor vehicle 20 for protecting a passenger from injuries during an accident. The system 100 is designed for use with an air bag inflator module 34 including a canister housing 36 mounted behind a dashboard 28 and below a panel 30 with an inflatable air bag 38 shown in a folded-up, non-deployed, position in FIG. 8 in readiness for rapid inflation (FIG. 9) to move outwardly through a panel opening 32 to support and cushion a vehicle passenger during an accident.

Figure 8:
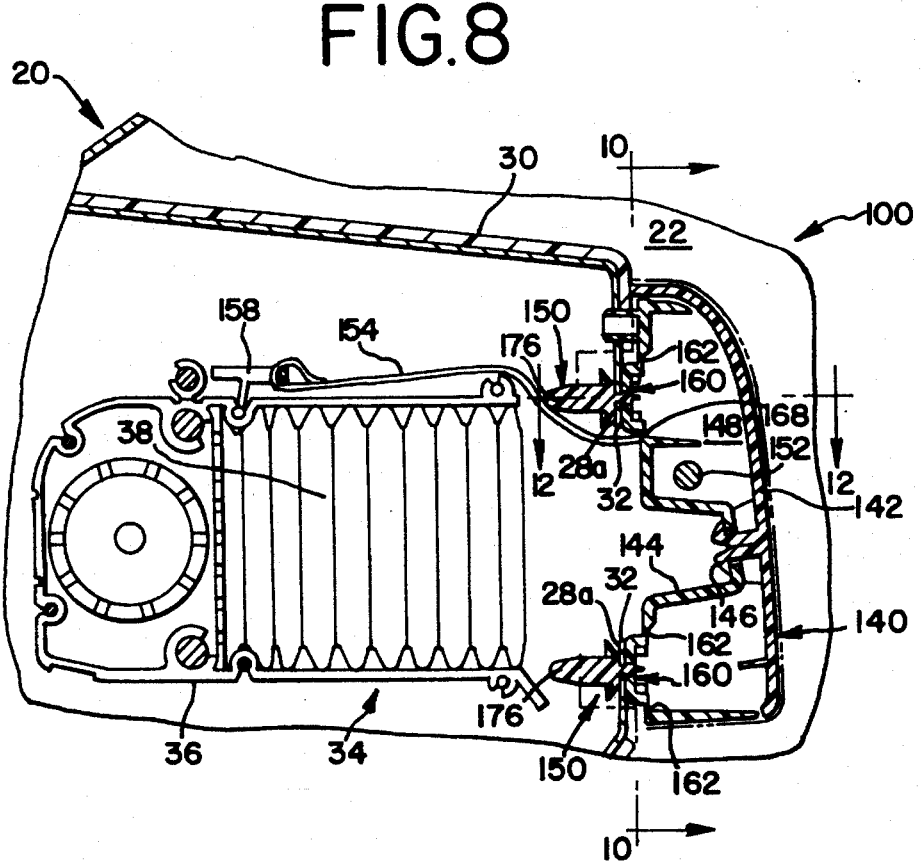
FIG. 8 is an enlarged, fragmentary, cross-sectional view similar to FIG. 4 illustrating another embodiment of a new and improved break-away fastening system for an air bag door illustrating the door in a closed position before deployment of the air bag.

The panel deployment opening 32 for the air bag 38 is normally closed by a door 140 as shown in FIG. 8 secured to a marginal edge portion 28a of the dashboard 28 surrounding the panel opening and which is provided with apertures 29 at opposite ends for receiving fasteners 150 constructed in accordance with the features of the present invention.

Figure 9:
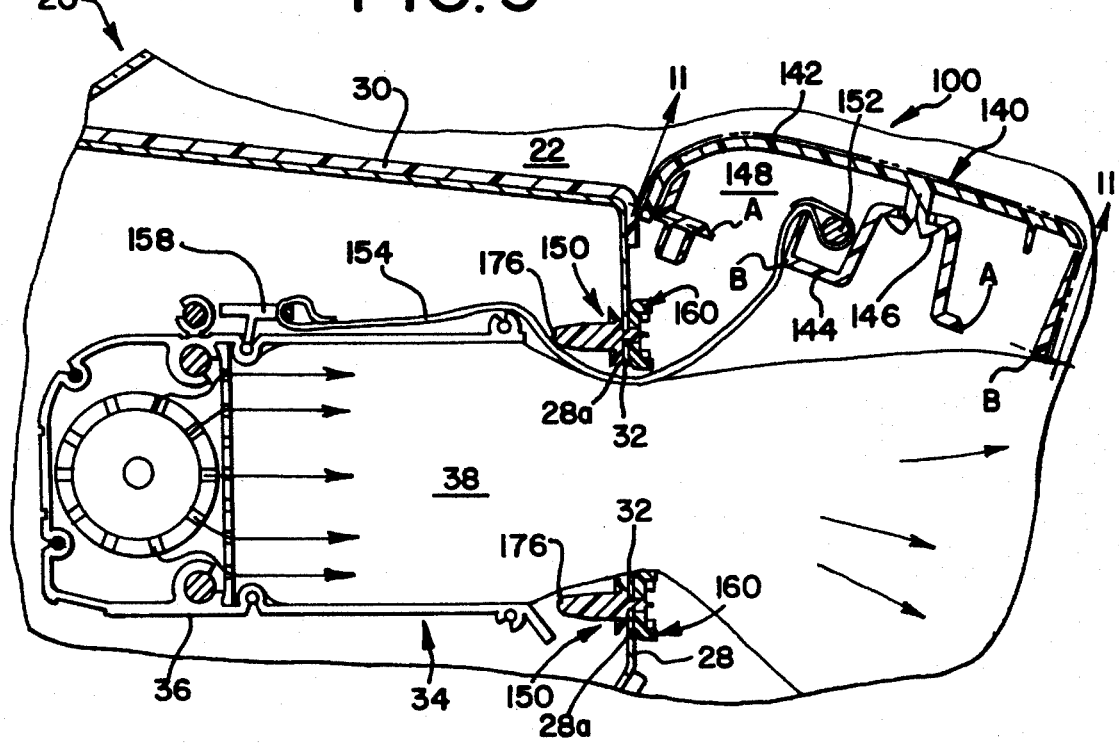
FIG. 9 is an enlarged, fragmentary view similar to FIG. 8, but illustrating the system with the door in an open position after deployment of the air bag has occurred.

The door 140 is preferably formed of molded plastic material which is strong and relatively light in weight to resist fractures and fragmentation into pieces when the high forces exerted by the rapid inflating air bag 38 are exerted against the inside or back side of the door during air bag deployment as shown in FIG. 9. The door includes a mold formed outer wall 142 having a profile as shown in FIGS. 8 and 9 and joined around a peripheral edge portion to an inner or inside wall 144 by means of integrally formed, generally cylindrical stakes 146 formed on the inside face of the outer wall, passed through openings in the inside wall and headed over against the back side of the inside wall in a heat staking operation as best shown in FIGS. 10–12.

The resultant hollow structure of the door 140 provides a large open space 148 between the heat staked together outer wall 142 and the inner wall 144 for accommodating a stress spreading elongated rod 152 mounted on the inner wall and connected to the outer end portion of one or more tether straps 154 which pass out through large rectangular-shaped slots 156 formed in the inner wall as shown in FIGS. 10 and 11. Inner ends of the tether straps 154 are secured to clips 158 permanently attached to the canister housing 36 of the air bag inflator module 34 as shown in FIGS. 8 and 9. When the air bag 38 is deployed as shown in FIG. 9, the tether straps 154 provide positive door restraint and limit the distance away from the panel opening 32 that the door 140 can move so as to protect occupants of the vehicle 20 against injuries from the door.

In accordance with the present invention, at opposite ends, the inner wall 144 of the door 140 is formed with a plurality of spaced apart, rearwardly or inwardly offset, generally square-shaped, wall segments 160. A fastener 150 is mounted on each offset wall segment 160 for securing the door 140 in a closed position over the panel opening 32.

Each inwardly or rearwardly offset wall segment 160 is integrally joined along upper and lower edges (A and B—FIGS. 10 and 11) by a thin fracture wall 162 to an immediately adjacent wall portion 164 of the inner wall 144. Between adjacent ends of each pair of upper and lower fracture walls 162 on opposite ends of the offset wall segment 160 there is provided an opening or slot 166 (FIGS. 12 and 13) for receiving a tongue 168 of a U-shaped base clip 170 having a bight 172 engaged against an inner side edge of an offset wall segment 160. Each tongue 168 has a free end with a thickened detent 169 (FIG. 12) at the outer edge to prevent withdrawal of the tongue from the slots 166 once the base clip 170 has been inserted into place with the tongue behind the offset wall segment.

Each base clip 170 also includes an outside base segment 174 which carries a bayonet-like leg 176 extending rearwardly at right angles for unidirectional movement and penetration into an awaiting aperture 29 on the marginal edge portion 28a around the panel opening 32 when the door 140 is mounted in place to close off the panel opening. The leg 176 is provided with a frustoconical spacing skirt 178 near the base 174 to provide spacing between the door 140 and the marginal edge portion 28a of the panel and to exert an outward bias on the door to prevent rattling and noise.

Each leg 176 is rounded at the outer free end and formed with a plurality of equilaterally spaced apart, integrally formed, locking fingers 180 (FIG. 12) sloping radially outwardly toward free ends 182 which engage the back side of the panel 28 around the opening 29 to permanently lock the fasteners 150 in place once the door 140 has been installed.

After the installation of the door 140 with the fasteners 150 locked in place as described and subsequently, when the air bag 38 is deployed to rapidly inflate and force the door 140 to open and move away from the panel opening 32, the inner wall 144 is fractured adjacent each fastener support segment 160 along the edges A and B at the thin fracture walls 162, which together with the slots 166 define a path of controlled breakage, leaving generally square-shaped, fracture formed openings 190 (FIG. 11) at opposite ends of the inner wall. As shown in FIG. 9, after air bag deployment, the fasteners 150 and the supporting offset wall segments 160 remain in place even though the door 140 has opened. Once the tongue 168 is fully inserted in the slot 166, the fastener 150 is securely fastened and retained at the right place or location to the door 140 and opposite end portions 168a and 168b of the tongue 168 are facing opposite inside edge surfaces 200 and 201 respectively of the inner wall 144.

When the door 140 is mounted in place to close the panel opening 32, the leg 176 of each fastener 150 is aligned with and pushed into an opening 29. The stress induced by this pushing action elastically strains both areas 162 along edges A and B. Thus both extremities of the tongue 168 at opposite end portions 168a and 168b are pushed against the edges 200 and 201 of the inner wall 144. So the force needed to push the leg 176 all the way through the opening 29 is directly transmitted to the inner wall 144 via the extremities 168a and 168b to the edges 200 and 201, and no longer by areas 162 along the edges A and B, thus breaking of the edges A and B during door mounting is then avoided. Even though a controlled, multiple fracture in the thin fracture wall segments 162 has taken place, the back face of the inner wall 144 of the door 140 remains smooth and has no fracture formed appendages which could damage the air bag 38 during deployment. Moreover, the open door 140 is securely tethered and the offset wall segments 160 and fasteners 150 are positively retained in the originally installed positions.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A break-away fastening system for securing an air bag deployment door in a position closing a panel opening aligned with an inflatable air bag, comprising:

fastener means including at least one pin and socket connector extending between an edge flange adjacent said panel opening and said door; and a fracture section of reduced cross-section formed in said door or edge flange around said pin and socket connector to break and release said door when said air bag is deployed to inflate through said panel opening.

2. The break-away fastening system of claim 1, wherein:

said fracture section comprises a groove encircling said pin and socket connector.

3. The break-away fastening system of claim 2, wherein:

said groove is formed on said door.

4. The break-away fastening system of claim 1, including:

a plurality of said pin and socket connectors having pins secured to said door at spaced apart positions and extending toward said edge flange.

5. The break-away fastening system of claim 4, wherein:

one of said grooves is formed around a pin of each pin and socket connector.

6. The break-away fastening system of claim 3, wherein:

said pin is mounted in a collar surrounded by said groove and mounted in said door.

7. The break-away fastening system of claim 6, wherein:

said collar has a threaded bore and said pin has a threaded inner end threaded into said bore.

8. The break-away fastening system of claim 7, wherein:
said pin has flatted surfaces adjacent said threaded end for accommodating a wrench used for tightening said pin in place in said collar.

9. The break-away fastener system of claim 3, wherein:
said socket includes a pair of mounting legs extended into a aperture provided in said panel edge flange for receiving said pin.

10. The break-away fastening system of claim 9, wherein:
said socket includes a plurality of deflectable spring legs engageable with said pin upon insertion thereof into said socket through said aperture.

11. A break-away fastening system for securing a door in a closed position over a panel opening for deployment of an air bag, said door comprising:
an inner wall member having a back face engaged by the air bag during deployment, said back face having one or more fastener support segments joined to an adjacent portion of said inner wall member by an integral thin fracture wall designed to break along a predetermined path when the air bag is deployed to push said inner wall member outwardly away from the panel opening; and
a fastener mounted on said segment for securing said door in place over the panel opening until the air bag is deployed, said path of fracture surrounding said fastener on said support segment defining an opening in said inner wall member in said adjacent portion.

12. The break-away fastening system of claim 11, wherein:
said fastener support segment is positioned between a plurality of said thin fracture walls on opposite sides.

13. The break-away fastening system of claim 12, wherein:
each said thin fracture wall on opposite sides of said fastener support segment has opposite ends terminating in an open slot extended transversely thereof.

14. The break-away fastening system of claim 13, wherein:
said fastener support segment is surrounded by at least one of said thin fracture walls and at least one of said slots which define said path of fracture.

15. The break-away fastening system of claim 14, wherein:
said fastener includes a base element having a tongue insertable into at least one of said slots extended toward the other of said slots and lying adjacent a front face of said inner wall member.

16. The break-away fastening system of claim 15, wherein:
said tongue has a free outer end extended through said other of said slots to contact said back face of said inner wall member.

17. The break-away fastening system of claim 16, wherein:
said base element includes a base overlying said support segment and said tongue and a leg extending outwardly of said base for locking engagement with an edge portion of the panel above the panel opening.

18. The break-away fastening system of claim 17, wherein:
said leg has at least one flexible locking finger adapted to lockingly engage the edge portion of the panel upon insertion of said leg through a fastener receiving aperture in the edge portion.

19. The break-away fastening system of claim 18, wherein:
said leg has a pair of said flexible locking fingers on opposite side integrally joining an outer end portion of said leg, each of said fingers sloping toward said base and outwardly from said leg and having a free edge adapted to engage a surface on the edge portion outside of said aperture for locking said fastener in place.

20. A break-away fastening system for holding a door in place in a closed position over a panel having opening for deployment of an air bag in a motor vehicle, said door comprising:
an inner wall having an inwardly offset segment for supporting a fastener mounted thereon for holding engagement within an aperture provided in a marginal edge portion of said panel extending along the panel opening, said offset segment being integrally joined on opposite edges to adjacent portions of said wall by thin, frangible wall sections, and open slots being provided between said opposite edges at an end of said frangible wall sections; and
a fastener having a base and a leg projecting outwardly thereof for unidirectional penetration into said aperture in the marginal edge portion, said base including a tongue inserted into said slot behind said offset segment and an outer portion outwardly of said offset segment joining said leg.

21. The break-away fastening system of claim 20, wherein:
said base comprises a U-shaped element wherein said tongue and outer portion are integrally joined by a bight adjacent one of said slots.

22. The break-away fastening system of claim 21, wherein:
said bight engages an edge of said offset segment.

23. The break-away fastening system of claim 20, wherein:
said leg has at least one flexible locking finger adapted to lockingly engage the edge portion of the panel upon insertion of said leg through a fastener receiving aperture in the edge portion.

24. The break-away fastening system of claim 23, wherein:
said leg has a pair of said flexible locking fingers on opposite sides thereof integrally joining an outer end portion of said leg, each of said fingers sloping toward said base and outwardly from said leg and having a free edge adapted to engage a surface on an edge portion of said panel outside of said aperture for locking said fastener in place.

25. The break-away fastening system of claim 23, wherein:
said tongue has a free end with holding means thereon for retaining engagement with an adjacent edge of said offset segment after insertion of said tongue into said slots.

* * * * *